UNITED STATES PATENT OFFICE.

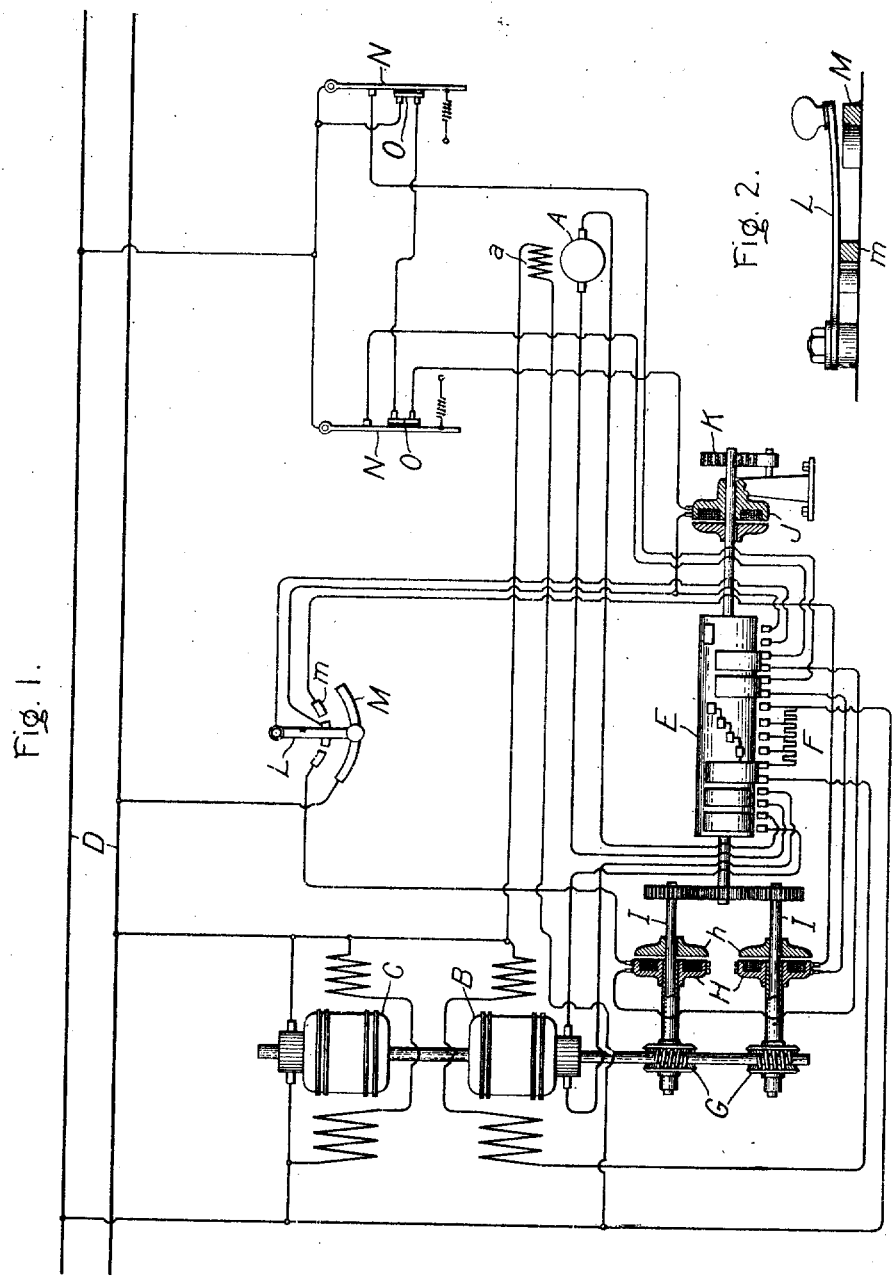

EDGAR F. DUTTON, OF SCHENECTADY, NEW YORK, ASSIGNOR TO GENERAL ELECTRIC COMPANY, A CORPORATION OF NEW YORK.

SYSTEM OF MOTOR CONTROL.

No. 890,622.   Specification of Letters Patent.   Patented June 16, 1908.

Application filed February 21, 1907. Serial No. 358,530.

*To all whom it may concern:*

Be it known that I, EDGAR F. DUTTON, a citizen of the United States, residing at Schenectady, county of Schenectady, State of New York, have invented certain new and useful Improvements in Systems of Motor Control, of which the following is a specification.

My invention relates to the control of electric motors, and is particularly applicable to the control of motors for operating turrets on battleships; though my invention is not limited to this particular application.

In the control of turrets, and in certain other systems of motor-control, it is desirable to reduce to a minimum the switch devices at the point of control. My invention has this object in view.

In one aspect, my invention consists in the combination with an electric motor and a controlling switch therefor, of a source of mechanical power, reversible gearing between the source and the switch, and means for controlling the gearing from a distance, so as to drive the motor-controlling switch in either direction to control the motor.

In order that the circuit of the motor may be interrupted instantaneously when the controlling switch is in any position, I provide a brake controllable from a distance for holding the switch in any position when the gearing is disconnected, and a spring for returning the switch automatically to off-position when both the gearing and the brake are disconnected.

My invention further comprises so arranging the controlling switch that the gearing is automatically disconnected and the brake operated whenever the controlling switch reaches either high-speed position.

My invention further comprises the employment of limit-switches operated by the turret, controlling both the gearing and the brake, so as to return the switch to off-position from any position which it may be occupying when the turret reaches the limit of its range of movement.

My invention will best be understood by reference to the accompanying drawings, in which Figure 1 shows diagrammatically a motor-control system arranged in accordance with my invention; and Fig. 2 shows a detail of the master-switch.

In the drawings A represents the armature, and $a$ the field of an electric motor, which may be of the series, shunt, compound or separately excited type. In the drawing the motor is shown separately excited from the mains. The motor armature is supplied from any suitable source of current indicated by a generator B, driven by a constant-speed shunt motor C supplied from the constant-potential mains D.

E represents a controlling-switch for the motor A, of which the left-hand contacts serve to connect the motor to the generator, and to reverse the connections of the motor so as to control its direction of rotation. The central contacts of this switch are arranged to short-circuit step-by-step a resistance F, which is in series with the field of the generator B. In this manner the voltage supplied to the motor and the motor speed are controlled. The right-hand contacts of the switch are for the purpose of controlling the gearing and brake, as will be hereinafter explained.

In order to drive the switch E, I make use of any convenient source of mechanical power. In the arrangement shown in the drawings, I utilize the shaft of the generator B for this purpose. Oppositely threaded worms G are placed on the shaft of the generator and engage worm-wheels carrying clutch members H. These clutch members are sleeved on shafts I, carrying the armatures of the clutches. When either clutch is energized, one shaft I is driven, and owing to the arrangement of the worms G shafts I are driven in opposite directions when clutched to the generator shaft. These shafts are geared to the switch E, so that when either clutch H is energized, switch E is driven in one direction or the other.

J represents a magnetic brake, the armature of which is keyed to the shaft of switch E, so that when the brake is energized the switch E is locked in position.

K represents a spiral spring for returning switch E to off-position whenever clutches H and brake J are both deënergized.

L represents the movable member of a self-opening master-switch placed at the point of control, which may be at any desired distance, both from the switch E and from the motor. This switch member L moves over an arc-shaped contact M and three contacts $m$ arranged on an arc concentric with the contact M. The switch member L, as shown in Fig. 2, is so arranged that normally it does not engage the contact M, but may be brought into engagement with it by depressing the handle of the switch; but opens the circuit when the handle is released.

N N represents limit-switches, which may be operatively connected to the turret, or other device driven by the motor, in any suitable and well-known manner, so that one of the switches will open when the turret reaches either limit of its travel. These switches N are arranged to break the circuits of the clutches H, respectively, and each switch carries contacts O, which are in series with each other and with the brake J, so that when either of switches N is open, the circuit of one clutch H and of brake J is open, and switch E is returned to its off-position from whatever position it may be occupying when the turret reaches either extreme of its range of movement. The circuit of the other clutch H, however, is not opened at the limit-switch, so that the circuit of this clutch may be closed by the master-switch, and the motor A started in the opposite direction to drive the turret; thereby allowing the limit-switch that is opened to be closed by its spring.

The operation of the system above described is as follows. At starting all parts are in the position shown. The circuit from the lower main D is open at switch L, and both clutches H and brake J are deënergized, so that switch E is in off-position. To drive the turret in either direction, the switch member L is moved in one direction or the other. If it is moved toward the left and its handle depressed, a circuit is closed from the lower line-wire D, through contact M, switch L, left-hand contact m, upper clutch H, contacts of switch E, left-hand switch N, to upper line-wire D. The upper clutch H is consequently energized, clutching switch E to the generator shaft. The switch is consequently rotated in one direction or the other, so as to close the circuit of motor A at the left-hand contacts of switch E, and then to start short-circuiting resistance F. The motor can be stopped at any instant, simply by releasing the handle of switch member L, allowing it to spring out of engagement with contact M, thereby deënergizing the clutch and allowing spring K to return switch E to off-position, or, if it is desired, to hold switch E in any intermediate position, switch L may be returned to its central position while holding the handle depressed. By this movement of the switch, clutch H is deënergized, and a circuit is closed from the lower line-wire D through contact M, switch L, central contact m, brake J, contacts O in series to upper line-wire D. The switch E is thereby disconnected from the generator shaft, and the brake J is energized to hold switch E in position. If switch member L is held in its left-hand position with its handle depressed, until switch E reaches its high-speed position, the right-hand contacts of this switch come into play to open the circuit of clutch H, and to close a circuit through brake J; thereby disconnecting the gearing and holding the switch in its high-speed position. Brake J is deënergized in any position of switch L, simply by releasing the handle. If, with switch E in any position, the turret reaches either limit of its range of movement, one of the switches N will be opened; thereby opening the clutch controlling the movement of the turret in that direction, and also opening the circuit of brake J, so that whether the switch E is being driven by the gearing, or is being held by the brake, it will be immediately returned to off-position. The other switch N, however, remains closed, so that by shifting the master-switch L to its opposite position, and depressing its handle, the clutch H for the other direction of movement of the turret will be energized; thereby moving switch E so as to connect the motor to the generator with the relative connections of armature and field reversed; and consequently shifting the turret in the opposite direction, and allowing the limit-switch, which has been opened, to be closed by its spring.

I do not desire to limit myself to the particular construction and arrangements of parts here shown, but aim in the appended claims to cover all modifications which are within the scope of my invention.

What I claim as new, and desire to secure by Letters Patent of the United States, is,—

1. In combination, an electric motor, a controlling switch therefor, a source of mechanical power, means controllable from a distance for connecting said switch to said source for driving said switch in either direction, a brake controllable from a distance for holding said switch in any position, and means for automatically returning the switch to off-position when released by said brake.

2. In combination, an electric motor, a controlling switch therefor, a source of mechanical power, reversible gearing between said source and said switch for driving said switch in either direction, magnetic clutches controlling said gearing, a magnetic brake for said switch, means for returning said switch automatically to off-position, and a master-switch controlling said clutches and brake.

3. In combination, an electric motor, a controlling switch therefor, a source of mechanical power, reversible gearing between said source and said switch for driving said switch in either direction, magnetic clutches controlling said gearing, a magnetic brake for said switch, means for returning said switch automatically to off-position, a master-switch controlling said clutches and brake, and limit-switches for limiting automatically the movement of the motor controlling said clutches and brake.

4. In combination, an electric motor, a controlling switch therefor, a source of mechanical power, reversible gearing between said source and said switch for driving said switch in either direction, magnetic clutches controlling said gearing, a magnetic brake for said switch, said switch including contacts for deënergizing said clutches and energizing said brake when the switch is in high-speed position, and means for automatically returning said switch to off-position.

5. In combination, an electric motor, a controlling switch therefor, a source of mechanical power, reversible gearing between said source and said switch for driving said switch in either direction, magnetic clutches controlling said gearing, a magnetic brake for said switch, means for returning said switch automatically to off-position, and a self-opening master-switch controlling said clutches and brake.

In witness whereof, I have hereunto set my hand this 19th day of February, 1907.

EDGAR F. DUTTON.

Witnesses:
HELEN ORFORD,
MARGARET E. WOOLLEY.